United States Patent
Rahal-Arabi et al.

(10) Patent No.: US 10,133,331 B2
(45) Date of Patent: Nov. 20, 2018

(54) MIXED CELL TYPE BATTERY MODULE AND USES THEREOF

(71) Applicant: Intel Corporation, Santa Clara, CA (US)

(72) Inventors: Tawfik M. Rahal-Arabi, Tigard, OR (US); Alexander B. Uan-Zo-Li, Hillsboro, OR (US); Mark MacDonald, Beaverton, OR (US); Vivek M. Paranjape, Hillsboro, OR (US); Andy Keates, Los Gatos, CA (US); Don J. Nguyen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/920,449

(22) Filed: Oct. 22, 2015

(65) Prior Publication Data

US 2016/0147273 A1    May 26, 2016

Related U.S. Application Data

(62) Division of application No. 13/727,113, filed on Dec. 26, 2012, now Pat. No. 9,189,056.

(51) Int. Cl.
*G06F 1/32* (2006.01)
*H01M 10/42* (2006.01)
(Continued)

(52) U.S. Cl.
CPC ............ *G06F 1/3203* (2013.01); *G06F 1/263* (2013.01); *G06F 1/28* (2013.01); *G06F 1/324* (2013.01);
(Continued)

(58) Field of Classification Search
CPC .... G06F 1/3203; G06F 1/3206; G06F 1/3212; H01M 10/4207; H04M 10/482; H02J 9/04; H04W 52/0261
See application file for complete search history.

(56) References Cited

U.S. PATENT DOCUMENTS

| 7,873,769 B2 * | 1/2011 | Kim ........................ G06F 1/30 320/162 |
| 2003/0167415 A1 | 9/2003 | Odaohhara et al. |

(Continued)

FOREIGN PATENT DOCUMENTS

| CA | 2380957 | 10/2003 |
| JP | 2006-262552 | 9/2006 |
| WO | 0054359 | 9/2000 |

OTHER PUBLICATIONS

NPL 1, "How does Rising Internal Resistance affect Performance", Nov. 26, 2011, Battery University, p. 1.*

(Continued)

*Primary Examiner* — Stefan Stoynov

(57) ABSTRACT

Various embodiments are generally directed to operation of a computing device powered with first and second sets of energy storage cells, the cells of the first set structurally optimized for higher density storage of electric power, and the cells of the second set structurally optimized for providing electric power at a high electric current level. A battery module includes a casing, a first cell disposed within the casing to store electric energy with a high density, and a second cell disposed within the casing to provide electric energy stored therein with a high current level. Other embodiments are described and claimed herein.

20 Claims, 8 Drawing Sheets

(51) Int. Cl.
*H01M 10/48* (2006.01)
*H02J 9/04* (2006.01)
*H04W 52/02* (2009.01)
*H01M 16/00* (2006.01)
*G06F 1/26* (2006.01)
*G06F 1/28* (2006.01)

(52) U.S. Cl.
CPC .......... *G06F 1/3206* (2013.01); *G06F 1/3212* (2013.01); *G06F 1/3234* (2013.01); *G06F 1/3296* (2013.01); *H01M 10/4207* (2013.01); *H01M 10/4257* (2013.01); *H01M 10/482* (2013.01); *H01M 10/486* (2013.01); *H01M 16/00* (2013.01); *H02J 9/04* (2013.01); *H04W 52/0261* (2013.01); *H01M 2010/4271* (2013.01); *Y02D 10/126* (2018.01); *Y02D 10/172* (2018.01); *Y02D 10/174* (2018.01); *Y02D 70/00* (2018.01); *Y02D 70/1224* (2018.01); *Y02D 70/1244* (2018.01); *Y02D 70/1246* (2018.01); *Y02D 70/1262* (2018.01); *Y02D 70/144* (2018.01); *Y02D 70/146* (2018.01); *Y02D 70/162* (2018.01); *Y10T 307/625* (2015.04)

(56) References Cited

U.S. PATENT DOCUMENTS

| | | | |
|---|---|---|---|
| 2005/0041352 A1* | 2/2005 | Seo | G06F 1/266 361/92 |
| 2007/0212596 A1* | 9/2007 | Nebrigic | H01M 10/44 429/61 |
| 2008/0176608 A1* | 7/2008 | Budampati | H04B 1/1615 455/572 |
| 2013/0042141 A1* | 2/2013 | Lin | G06F 1/263 714/14 |
| 2013/0332748 A1* | 12/2013 | Kolla | G06F 1/26 713/300 |
| 2014/0087227 A1* | 3/2014 | Shih | H01M 2/0277 429/99 |

OTHER PUBLICATIONS

Extended European Search Report received for European Patent Application No. 13866578.1, dated Jul. 14, 2016, 9 pages.

\* cited by examiner

MIXED CELL TYPE BATTERY MODULE AND USES THEREOF

CROSS-REFERENCE TO RELATED APPLICATIONS

This application is a divisional of, claims the benefit of and priority to previously filed U.S. patent application Ser. No. 13/727,113 filed Dec. 26, 2012, entitled "MIXED CELL TYPE BATTERY MODULE AND USES THEREOF", the subject matter of which is incorporated herein by reference in its entirety.

BACKGROUND

Current portable computing devices tend to place diametrically opposed requirements on their batteries. Much of the time, such portable devices operate in a so-called "standby" or lower power mode in which they consume electric power at a highly reduced rate with the expectation that doing so will result in far longer runtimes for their batteries. Yet, between lengthy periods of operation in such a lower power mode, there are also shorter periods of time in which such portable devices operate in a so-called "turbo" or higher power mode in which they consume electric power at a highly elevated rate.

Usually, such higher power modes entail operating at least one processor circuit (often the "central" processor circuit, but could be a specialized graphics or other processor circuit) at a higher clock rate, with more processor core components active, and/or with other processing-related features active. Often, a component of an operating system and/or logic within the processor circuit itself determines when to switch between such lower and higher power modes. Also, the impetus to switch from a lower power mode to a higher power mode is often the detection of a type of processing and/or an amount of processing required. Such an impetus is frequently supplied by the start of a particular type of task (e.g., floating point or vector math, video compression or decompression, etc.).

In recent years, several new battery technologies have come to be put in wide use, each usually able to offer higher densities of storage of electric power than its predecessors. Thus, it has become increasingly feasible to produce physically small batteries of a shape and size that are highly desirable for use in portable computing devices that also store a considerable amount of electric power such that lengthy runtimes in a lower power mode are frequently provided.

However, achieving such high energy storage densities to enable such lengthy runtimes in a lower power mode has lead to the cells of which batteries are composed having a construction that has a reduced ability to provide high power output (specifically, electric power output at high current levels) for even short periods of time. Further, some newly developed cell technologies also intrinsically have a high energy storage density, yet low current output capability. It is with respect to these and other considerations that the embodiments described herein are needed.

DETAILED DESCRIPTION

Figure 1:
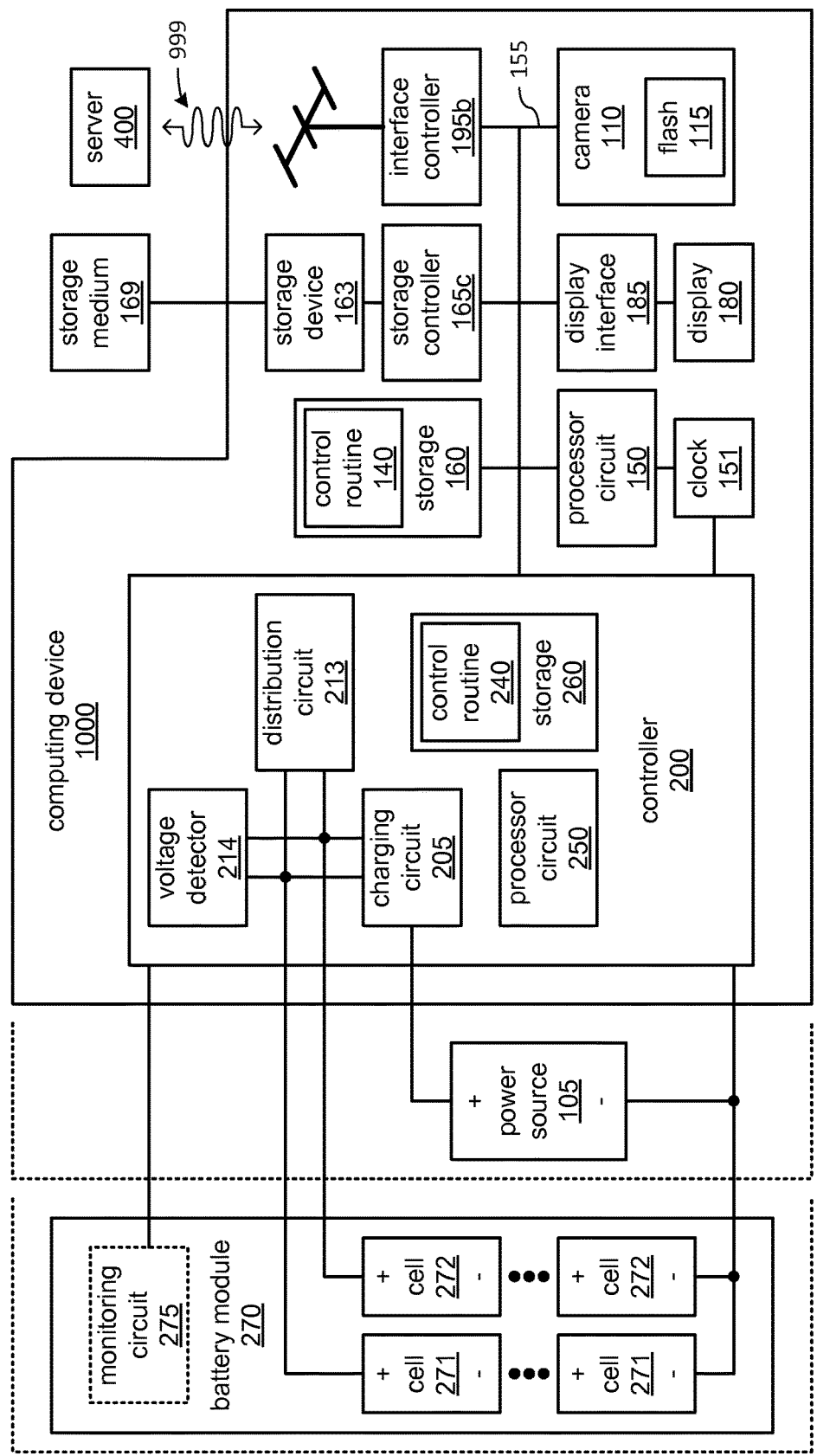
FIG. 1 illustrates a first embodiment of a computing device.

Various embodiments are generally directed to operation of a computing device powered with first and second sets of energy storage cells, the cells of the first set structurally optimized for higher density storage of electric power, and the cells of the second set structurally optimized for providing electric power at a high electric current level. For much of the time it is in operation, the computing device operates in a lower power mode and relies, at least primarily, on the first set of cells to provide its electric power during the lower power mode. However, during occasional brief periods of time during its operation, the computing device operates in a higher power mode and relies, at least primarily, on the second set of cells to provide its electric power during the higher power mode.

The first and second sets of cells may be carried in physically separate battery modules and/or may be built into the casing of the computing device such that they are integral to the computing device. Alternatively, the first and second sets of cells may be physically incorporated together into a common casing of a single battery module that is separable from a computing device. The cathodes of the cells of both sets may be coupled at a common cathode node (possibly within the casing of a single battery module), and/or the anodes of the cells of both sets may be coupled at a common anode node (possibly within that casing). Alternatively, separate anodes and/or cathodes of the first and second sets of cells may be isolated from each other within a casing of a single battery module and may be separately presented to power distribution, recharging and/or voltage detection circuitry of the computing device, thereby better enabling separate monitoring and operation of the two sets of cells.

The first and second sets of cells may employ substantially the same battery chemistry, including and not limited to, nickel cadmium (NiCd or NiCad), nickel metal hydride (NiMH), lithium ion (Li-ion), and lithium polymer (Li-poly). Alternatively, the first and second sets of cells may employ entirely different chemistries. Regardless of whether both sets use the same or different battery chemistries, for at least some of the battery chemistries that may be employed, the internal structures of the cells of each set may physically differ. Specifically, each cell of the first set may employ thinner anode and cathode conductors separated by thicker energy storage layers to provide greater energy storage density, while each cell of the second set may employ thicker anode and cathode conductors separated by thinner energy storage layers to enable greater current flow.

The computing device may incorporate a controller that coordinates use of the two sets of cells with a main processor circuit of the computing device. The main processor circuit may proactively signal the controller of an impending instance of entering a higher power mode. Alternatively or additionally, upon substantial depletion of the second set of cells, the controller may signal the main processor circuit to limit or refrain from operation in a higher power mode until the second set of cells can be recharged.

In one embodiment, for example, a battery module includes a casing, a first cell disposed within the casing to store electric energy with a high density, and a second cell disposed within the casing to provide electric energy stored therein with a high current level. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 optionally coupled to a server 400. The computing device 1000 may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc. As depicted, the computing devices 400 and 1000 exchange signals conveying any of a variety of types of data via a network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. However, as depicted, the network 999 is a wireless network.

In various embodiments, the computing device 1000 comprises one or more of a processor circuit 150 (in the role of a main processor circuit of the computing device 1000), a storage 160 storing a control routine 140, a camera 110, a storage controller 165c, a display interface 185, and an interface controller 195b. As depicted, the camera 110 comprises a flash 115. As depicted, the storage controller 165c and the display interface 185 are coupled to a storage device 163 providing access to the contents of a storage medium 169, and to a display 180, respectively. The computing device 1000 may additionally comprise one or more of the storage device 163 and the display 180. The interface controller 195b couples the computing device 1000 to the network 999, and therethrough to one or more other computing devices such as the server 400.

The computing device 1000 also comprises a controller 200. The controller 200 comprises one or more of a processor circuit 250 (in the role of a controller processor circuit), a storage 260 storing a control routine 240, a charging circuit 205, a power distribution circuit 213, and a voltage detector 214. Through the controller 200, the computing device 1000 is coupled, at least at various times, to one or both of a power source 105 and a battery module 270 to receive electric power from one or both of them. The battery module 270 is made up of one or more of an electric power storage cell 271 optimized for storing electric power with higher density, and one or more of an electric power storage cell 272 optimized for providing electric power with higher current flow. The battery module 270 may also include a monitoring circuit 275 coupled to the controller 200 via a serial bus or other signaling conductors. The monitoring circuit 275 may include one or more of a temperature sensor, a counter of hours of operation, protective circuitry, etc. Although the power source 105 may be any of a variety of types of power source based on any of a variety of technologies, it is envisioned that the power source 105 is an adapting device (e.g., a transformer, power converter, etc.) coupling the computing device 1000 to an AC mains power or other electric power source of considerable capacity, or that the power source 105 is itself such a power source of considerable capacity (e.g., a fuel cell, solar panel, etc.).

Within the controller 200, the charging circuit 205 is coupled to each of the power source 105 and the cells 271 and 272 of the battery module 270 to enable charging of the cells 271 and 272 from electric power provided by the power source 105. The distribution circuit 213 is coupled to at least the cells 271 and 272 to distribute electric power provided by the cells 271 and/or 272 to other components of the computing device 1000 (e.g., the processor circuit 150, the storage 160, etc.). The voltage detector 214 is also coupled to the cells 271 and 272 to monitor their voltage levels.

It should be noted that in various possible embodiments, the power source 105 and/or the battery module 270 may be incorporated into a casing of the computing device 1000 (as hinted at via the dotted lines partly surrounding them), and alternatively or additionally, may be detachable (physically and/or electrically) from the rest of the computing device 1000. In still other embodiments, the cells 271 and the cells 272 may be separately housed within the computing device 1000 and/or made separately detachable from the rest of the computing device 1000. In yet other embodiments, the cells 271 and the cells 272 may be housed within a casing of the computing device 1000 without a separate or detachable casing of their own such that they are integral to the computing device 1000. It should also be noted that although the power source 105, the cells 271 and the cells 272 are depicted as all being coupled to the controller 200 via a single common cathode node and separate anode nodes, other embodiments are possible in which the anodes and cathodes of the power source 105, the cells 271 and the cells 272 are coupled to the computing device 1000 in other configurations of electrical nodes.

The controller 200, with the processor circuit 250 executing at least the control routine 240 in its role as the controller processor circuit defines an operating environment of the controller 200 that may be intentionally isolated from a main operating environment defined within much of the rest of the computing device 1000 by at least the processor circuit 150 executing the control routine 140 in its role as the main processor circuit. More specifically, the processor circuit 150 may be provided with limited or no access to the storage 260 and/or other components of the controller 200, thereby preventing unauthorized access to at least the control routine 240 (either as stored in the storage 260 or as executed by the processor circuit 250) by the processor 150. In contrast, the processor circuit 250 may have far greater access to hardware and/or software components of the rest of the computing device 1000 beyond the controller 200. As will be explained in greater detail, this enables the operating environment of the controller 200 to be employed in independently recurringly checking and providing information on the state of the electric power provided by each of the power source 105 and the battery module 270 to the rest of the computing device 1000.

It should be noted that although the controller 200 is depicted and discussed herein as incorporating a processor circuit executing a control routine implementing logic in the form of instructions to cause the controller 200 to perform the various functions described herein, this is but one example of the manner in which the controller 200 may be implemented. Other embodiments are possible in which the controller 200 is implemented substantially or entirely in hardware-based digital logic in which no instructions of any form of routine are executed. In such implementations, one or more discrete logic components and/or programmable logic devices may be used. Stated differently, the controller 200 comprises logic (implemented in any of a variety of ways) that causes the controller to perform the various functions described herein.

The computing device 1000 further comprises a coupling 155 that couples one or both of the processor circuit 150 and the controller 200 to one or more of the storage 160, the camera 110, the storage controller 165c, the display interface 185, and the interface controller 195b. The coupling 155 is comprised of one or more buses, point-to-point interconnects, transceivers, buffers, crosspoint switches, and/or other electrical/optical conductors and/or logic. With the processor circuit 150 and the controller 200 being so coupled by the coupling 155, each is able to perform the various ones of the tasks to be described herein.

In some embodiments, the computing device 1000 may be at least partially implemented as a SOC (system on-a-chip) in which at least some of the processor 150, the storage 160, the camera 110, the storage controller 165c, the display interface 185, the interface controller 195b and the controller 200 may be combined within a single IC (integrated circuit). In such embodiments, the coupling 155 may be formed as conductive traces traversing portions of a single common silicon die on which at least some of the components 110, 165c, 185 and 195b are disposed. Alternatively, portions of one or more of these components may be spread across more than one silicon die incorporated into a MCM (multi-chip module), in which case a subset of the coupling 155 may extend between the separate silicon die within that MCM package at least partially as gold wires or other forms of electrical/optical conductors. As yet another alternative, these components may be spread across more than one silicon die disposed within separate chip packages (pin grid array, ball grid array, land grid array, dual in-line package, etc.), in which case the coupling 155 may extend between die at least partially as traces formed on one or more circuitboards on which each of those chip packages are disposed.

A function of the controller 200 is to convey and distribute electric power from the cells 271 and 272 of the battery module 270 to other components of the computing device 1000, and to cooperate with the power source 105 to effect recharging of the cells 271 and 272 at times when the power source 105 is able to provide electric power (e.g., at times when the power source 105 is coupled to AC mains). At times when the power source 105 is able to provide electric power, the controller 200 may provide other components of the computing device 1000 with electric power from the power source 105, instead of from one or both of the cells 271 and 272. This function of providing electric power to other components of the computing device 1000 is to enable the computing device to be used by an operator of the computing device 1000 for whatever purposes that the operator intends and/or for which the computing device 1000 is configured.

In providing electric power to components of the computing device 1000 from one or both of the cells 271 and 272, the controller 200 generally provides electric power from the cells 271 at times when the computing device 1000 is operated in a lower power mode (e.g., a "standby" mode) to take advantage of the higher density of storage of electrical energy within the cells 271 to provide the computing device 1000 with a considerable amount of runtime in the lower power mode. The controller 200 also generally provides electric power from the cells 272 at times when the computing device 1000 is operated in a higher power mode (e.g., a "turbo" mode) to take advantage of the higher output current capability of the cells 272 to provide the computing device 1000 with a heightened amperage of electric power to support the operation of more components simultaneously and/or to support operation of one or more components at a higher clock speed.

Figure 2:
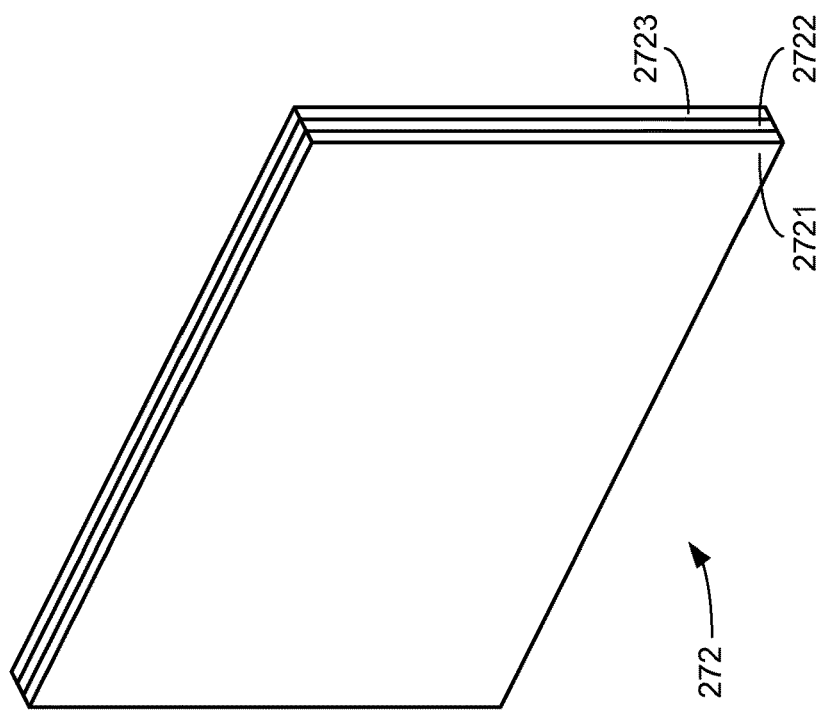
FIG. 2 illustrates a portion of the embodiment of FIG. 1, depicting structural aspects of energy storage cells.
Figure 2:
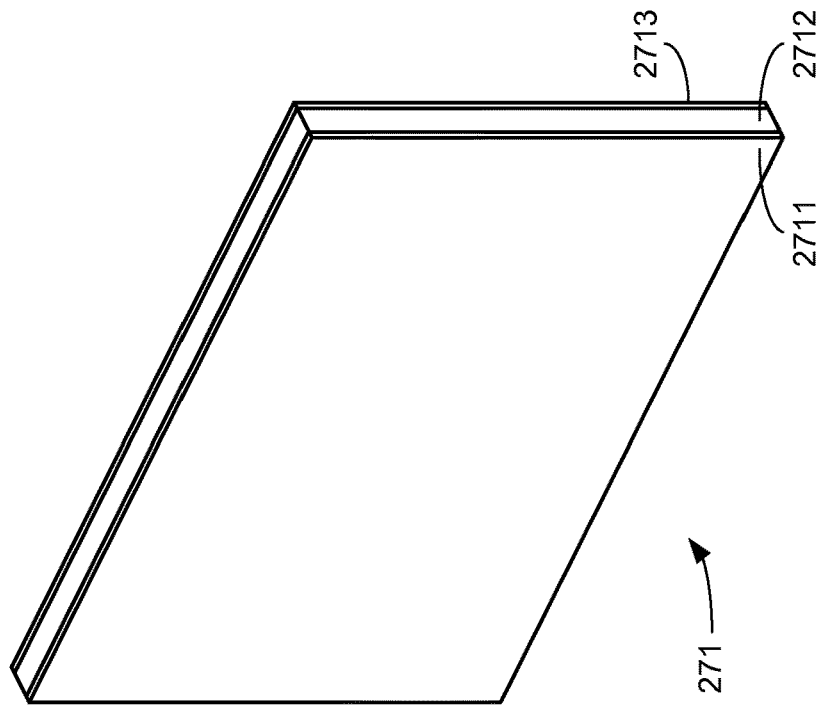

Turning briefly to FIG. 2, portions of possible implementations of the cells 271 and 272 are depicted. As will be familiar to those skilled in the art, cells based on such battery chemistries as NiCd, NiMH, Li-ion and Li-poly are commonly made either in a cylindrical configuration with concentrically positioned layers of anode conductors, cathode conductors and energy storage layers, or in a substantially flat configuration with the layers of anode conductors, cathode conductors and energy storage layers stacked flat. What is depicted in FIG. 2 are portions (only three layers) of variants of one each of the cells 271 and 272 having the latter configuration. Normally, such cells are constructed of many more than three layers. The depicted portion of a cell 271 is made up of an energy storage layer 2712 sandwiched between an anode conductor 2711 and a cathode conductor 2713. Similarly, the depicted portion of a cell 272 is made up of an energy storage layer 2722 sandwiched between an anode conductor 2721 and a cathode conductor 2723. As depicted, the anode conductor 2711 and the cathode conductor 2713 of the cell 271 are thinner than the anode conductor 2721 and the cathode conductor 2723 of the cell 272, and the energy storage layer 2712 of the cell 271 is thicker than the energy storage layer 2722 of the cell 272.

This difference in the structures between these depicted portions of a cell 271 and a cell 272 arises from the different goals of behind them—as has been discussed, the cells 271 are optimized to store electrical energy with a greater density, while the cells 272 are optimized to enable electrical energy stored within them to be provided with a greater electrical current. The thicker energy storage layer 2712 enables greater energy storage, but results in greater resistance against current flow such that the larger stored amount of electric power cannot be provided with a high current flow without generating a level of heat that can damage the cell 271 and at a reduced voltage. The thinner energy storage layer 2722 results in a lesser resistance against current flow such that electric power can be provided by the cell 272 with greater current flow (i.e., the increased conductivity enables greater electric power delivery), but results in a reduction in the amount of energy that is able to be stored in each energy storage layer.

Figure 3:
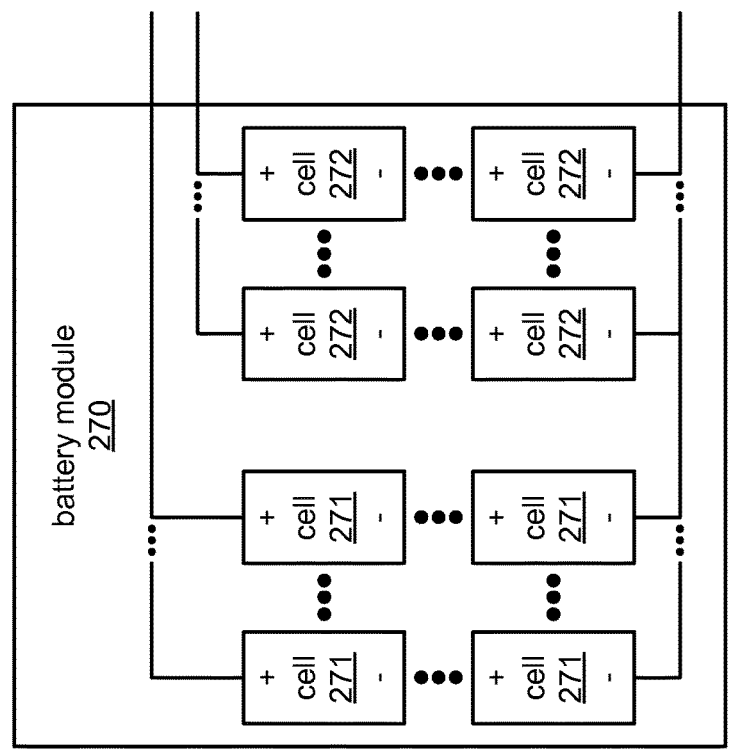
FIG. 3 illustrates a portion of the embodiment of FIG. 1, depicting aspects of a battery.

Turning briefly to FIG. 3, it is important to note that although FIG. 1 depicted the battery module 270 as being made up of a single set of cells 271 coupled only in series (no cells 271 coupled in parallel with each other) and being made up of a single set of cells 272 also coupled only in series (no cells 272 coupled in parallel with each other), this not the only possible configuration of couplings among the cells in each of these sets of cells. Specifically, as depicted in FIG. 3, multiple sets of the cells 271 coupled to each other in series may, in turn, be coupled to each other in parallel. And further, multiple sets of the cells 272 coupled to each other in series may, in turn, be coupled to each other in parallel, as well. Indeed, any of a variety of possible configurations of coupling among the cells 271 and among the cells 272 may be resorted to as needed to satisfy requirements to provide electric power at selected voltages and/or with selected current levels.

Still further, although not specifically depicted, embodiments are possible in which there is only one each of the cells 271 and 272. Yet further, and although also not depicted, other configurations are possible in which there may be a third type, or still more types of cells beyond the two types of cell 271 and 272 that have been depicted and discussed. Specifically, beyond the inclusion of a type of cell optimized for dense storage of electric energy (e.g., the cell 271) and a type of cell of cell optimized for delivery of electric power with a high output (e.g., the cell 272), there could be a third type of cell that may be resorted to that is more capable of storage and/or delivery of electric power in ranges of temperature (e.g., extremes of cold and/or heat) for which other types of cells are ill suited. In such a case, the processor circuit 250 may cause such a third type of cell to be used, possibly in lieu of other types of cells, as a response to detection of colder or hotter conditions outside of typical room temperature conditions, possibly relying on a temperature sensor of the monitoring circuit 275 (if present).

Returning to FIG. 1, in some embodiments, the distribution circuit 213 is made up primarily of electronic components that passively enable the provision of electric power from either or both of the cells 271 and 272 based on changes in the amount of electric current with which other components of the computing device consume electric power. In other embodiments, the distribution circuit 213 is at least partly actively controlled, possibly by the processor circuit 200. Such active control may be responsive to proactive signaling from other components of the computing device 1000 (e.g., the processor 150) of upcoming changes in power consumption, responsive to an amount of power consumption that is detected, or responsive to an indication of depletion of one or both of the cells 271 and 272 to a selected degree.

Figure 4A:
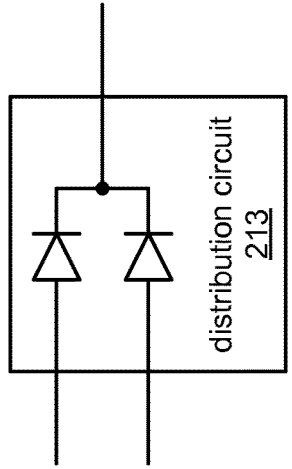
FIGS. 4a through 4c each illustrate a portion of the embodiment of FIG. 1, depicting possible implementations of a distribution circuit.
Figure 4B:
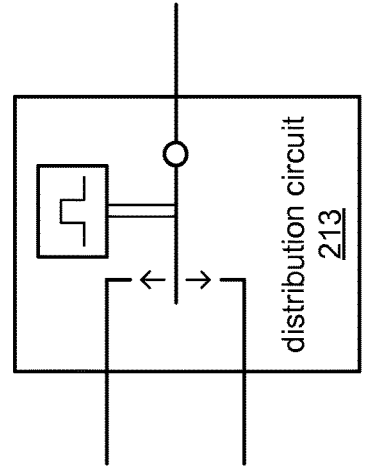
Figure 4C:
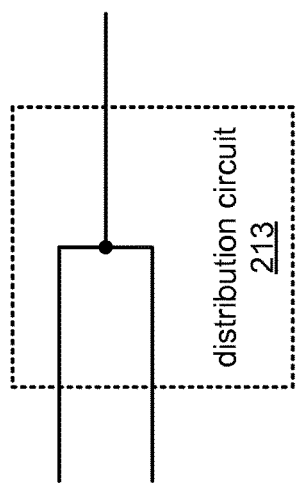

FIGS. 4a, 4b and 4c, depict three possible implementations of the distribution circuit 213 that exemplify passive provision of electric power from either or both of the cells 271 and 272 in the sense that there is no active choice made between either set of cells. In FIG. 4a, the distribution circuit is formed largely of two diodes through which the anode node of the cells 271 is combined with the anode node of the cells 272. In FIG. 4b, a semiconductor-based switching device of any of a variety of types is driven with an oscillator to repeatedly, but separately, couple each of the anode node of the cells 271 and the anode node of the cells 272 to a node conveying electric power to other components of the computing device at a high switch rate. In FIG. 4c, the anode nodes of the cells 271 and 272 are simply directly coupled together, allowing the cells 271 and 272 to directly interact to balance the characteristics with which each provides electric power. Still other passive forms are possible. Use of such passive forms of conveying electric power from either or both of the cells 271 and 272 to other components of the computing device 1000 rely on the differing electrical characteristics of the cells 271 and 272 themselves to effect selection of which of the cells 271 and 272 provide electric power at any given time.

Figure 5:
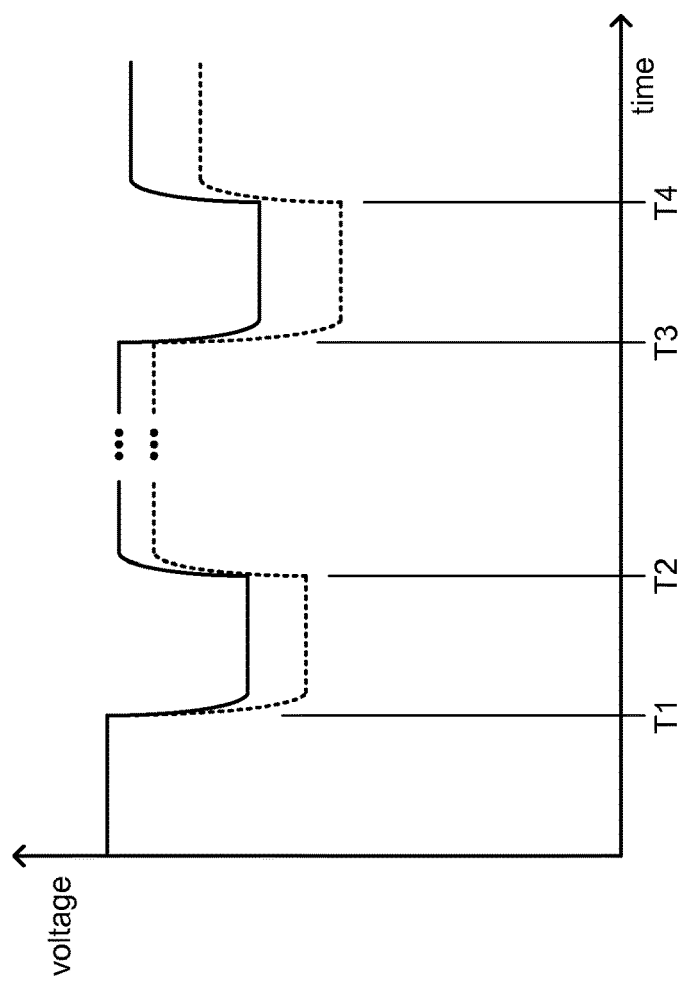
FIG. 5 illustrates a graph of sample behavior arising from use of one possible implementation of the embodiment of FIG. 1.

Turning briefly to FIG. 5, a graph is depicted comparing the results of transitions between lower and higher power modes with just the cells 271 (shown with a dotted line) and a combination of the cells 271 and 272 (shown with a solid line). In this depicted case, the anode node of a set of the cells 271 is coupled to the anode node of a set of the cells 272 (as depicted in FIG. 4c), and the cathode node of the set of the cells 271 is coupled to the cathode node of the set of the cells 272. Also in this depicted case, the cells 271 and 272 are based on the same battery chemistry such that each of both types of cells provides electric power with the same voltage. Leading up to time T1, electric power is drawn in a lower power mode with a lower amount of electric current. At T1, a transition to a higher power mode in electric power is drawn at a higher electric current results in a drop in the level of voltage with which electric power is provided. However, as depicted, the drop in voltage is more pronounced where only the cells 271 are present than where both cells 271 and 272 are present. With a transition back to drawing electric power at a lower amount of electric current at time T2, the voltage level rebounds towards where it was before time T1, but somewhat less than what it was before time T1. However, the voltage level rebounds closer to where it was before time T1 where both the cells 271 and 272 are present than where only the cells 271 are present. At times T3 and T4, the same behaviors observed at times T1 and T2, respectively, are repeated, but with more pronounced drops in voltage levels.

The behavior shown in FIG. 5, where the cells 271 are accompanied by the cells 272 (depicted with solid lines), is indicative of the cells 272 providing a significant proportion of the electric power during a higher power mode between times T1 and T2, and between times T3 and T4. Thus, during such periods of time, the cells 271 are not pressed into delivering electric power at a level of current for which they are not optimized to provide, and which would likely damage them over time due to overheating of their energy storage layers as a result of their higher resistance.

Returning to FIG. 1, the charging circuit 205 may autonomously cooperate with the distribution circuit 213 to coordinate transitions between the cells 271 and 272 providing electric power to components of the computing device 1000 and the power source 105 both providing that electric power and recharging the cells 271 and 272. Alternatively, such coordination may be caused to occur under the control of the processor circuit 250, and possibly in a manner that includes some degree of coordination in the use of electric power with the processor circuit 150. At least the processor circuit 250 may employ the voltage detector 214 to monitor voltage levels of one or both of the sets of cells 271 and 272. Alternatively, in embodiments in which the battery module 270 includes a variant of the monitoring circuit 275 that is able to monitor voltages, the processor circuit 250 may employ the monitoring circuit 275 to do so, instead.

Regardless of how the recharging of the cells 271 and 272 is coordinated with the provision of electric power to other components of the computing device 1000, it should be noted that the charging of each of the cells 271 and 272 may be handled differently from one other. By way of example, one of the cells 271 and 272 may be charged before the other, possibly as a result of a selected order of priority in charging of these cells. Specifically, it may be deemed desirable to charge the cells 272 first, since typically, cells that are able to output their stored electric energy at a higher rate are able to be charged at a higher rate, thereby enabling those cells to be fully prepared for use more quickly. This may entail the charging circuit 205 including effectively side-by-side chargers, each dedicated towards charging a different one of the cells 271 and 272. Alternatively, the cells 271 and 272 may be charged simultaneously, with the cells 271, due to their electrical characteristics, becoming fully charged more quickly.

In executing at least the control routine 240 in embodiments in which the distribution circuit 213 operates substantially passively, the processor circuit 250 (acting in its role of a controller processor circuit) is largely caused to monitor the voltage detector 214 and/or the monitoring circuit 275 to oversee the condition of the cells 271 and 272. In overseeing their condition, the processor circuit 250 may be caused to monitor aspects of these two sets of cells other than their voltage outputs, including and not limited to, their temperature, current flow, count(s) of their time in operation, etc. Where the voltage level of one or both of the sets of cells 271 and 272 falls to a selected threshold (the threshold may be different for each set of cells), and/or where the temperature of one or both sets of cells 271 and 272 rises to a selected threshold (again there may be different thresholds for each set of cells) the processor circuit 250 may be caused to signal the processor circuit 150 that the amount of electric power remaining has become very limited. This may enable the processor circuit 150 to provide an indication to an operator of the computing device 1000 (possibly with a visual presentation of such information on the display 180 and/or in some other manner) that a highly diminished amount of electric power remains. Further, where the voltage level of the cells 272 has fallen below a selected threshold, but the voltage level of the cells 271 has not, the processor circuit 250 may be caused to signal the processor circuit 150 with an indication of this to enable the processor circuit 150 to limit use of a higher power mode, possibly refraining from transitioning into a higher power mode until the cells 272 have been recharged. In embodiments in which the distribution circuit 213 is able to be controlled by the processor circuit 250 to actively select one or the other of the cells 271 or 272 to provide electric power to components of the computing device 1000, the processor circuit 250 may be caused to operate the distribution circuit 213 to select one or the other of these sets of cells in response to receiving signals from the processor circuit 150 of an impending transition between lower and higher power modes.

In executing at least the control routine 140 in embodiments in which the distribution circuit 213 operates substantially passively, the processor circuit 150 (acting in its role of a main processor circuit) is largely caused to respond to signals received from the controller 200 concerning the availability of electric power. More specifically, upon receiving a signal from the controller 200 to the effect that the remaining amount of electric power is low, the processor circuit 150 may be caused to take actions to either limit further consumption of electric power, including and not limited to, reducing a clock speed of operation of the processor circuit 150 and/or another processor circuit, reducing the light level output of the flash 115 and/or of backlighting of the display 180, and/or withdrawing at least some amount of electric power from the storage device 163 or a wireless transmitter of the interface controller 195b if either is not in use. Alternatively or additionally, the processor circuit 150 may present a notification to an operator of the computing device 1000 that the remaining amount of electric power is low, possibly via a visual presentation of such notice on the display 180, emission of a warning sound, or in any of a variety of other ways. Further, upon receiving a signal from the controller to the effect that the effect that electric power stored in the cells 272 (electric power meant to support higher power modes) is greatly depleted, the processor circuit 150 may limit or refrain from transitioning the computing device 1000 into a higher power mode until the processor circuit 150 receives a subsequent signal from the controller 200 indicating that the cells 272 have been recharged. In embodiments in which the distribution circuit 213 is able to be controlled by the processor circuit 250 to actively select one or the other of the cells 271 or 272 to provide electric power to components of the computing device 1000, the processor circuit 150 may signal the controller 200 with indications of an impending transition between lower and higher power modes to proactively enable transitions among provision of electric power by one or the other of the cells 271 and 272, and/or possibly by both of the cells 271 and 272.

In various embodiments, each of the processor circuits 150 and 250 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160 and 260, as well as the combination of the storage device 163 and the storage medium 169, may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface controller 195*b* may employ any of a wide variety of signaling technologies enabling the computing device 1000 to be coupled to other devices as has been described. Each of these interfaces comprises circuitry providing at least some of the requisite functionality to enable such coupling. However, this interface may also be at least partially implemented with sequences of instructions executed by the processor circuits 150 and/or 250 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In various embodiments, the display 180 (accessible via the display interface 185) may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing device 1000, or may be disposed on a separate casing of a physically separate component of the computing device 1000 (e.g., a flat panel monitor coupled to other components via cabling).

Figure 6:
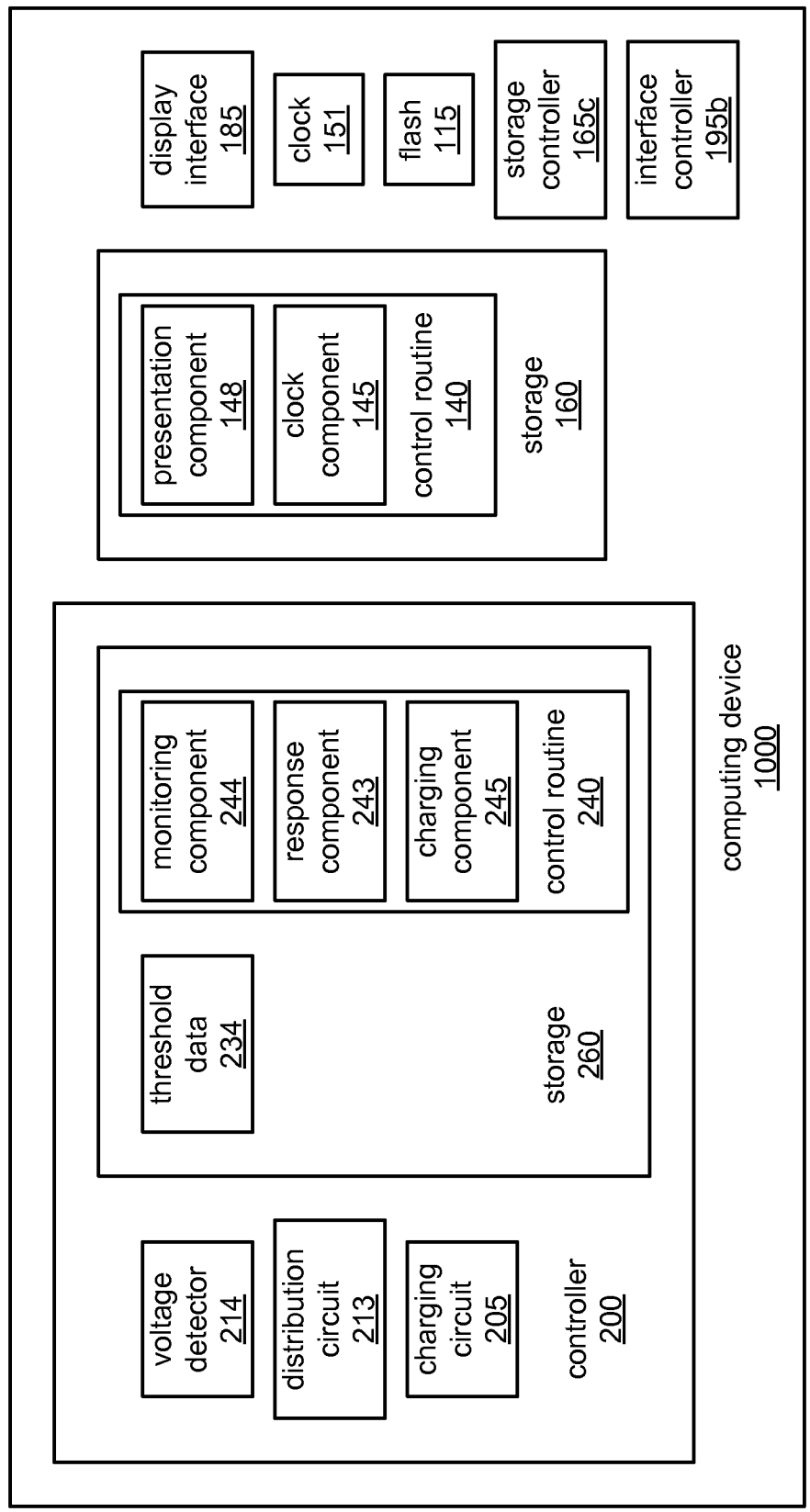
FIG. 6 illustrates a portion of the embodiment of FIG. 1, depicting aspects of an operating environment.

FIG. 6 illustrates portions of the computing device 1000 of FIG. 1 in greater detail. More specifically, aspects of the operating environments of the processor circuits 150 and 250 executing respective ones of the control routine 140 and 240 to perform the aforedescribed functions are depicted. As will be recognized by those skilled in the art, each of the control routines 140 and 240, including the components of which each is composed, implement logic as a sequence of instructions and are selected to be operative on (e.g., executable by) whatever type of processor or processors that are selected to implement each of the processor circuits 150 and 250, respectively. Further, it is important to note that despite the depiction in these figures of specific allocations of implementation of logic between hardware components and routines made up of instructions, different allocations are possible in other embodiments.

In various embodiments, one or both of the control routines 140 and 240 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150 and 250, including without limitation, Windows™, OS X™ Linux®, iOS, or Android OS™. Where one or more device drivers are included, those device drivers may provide support for any of a variety of other components, whether hardware or software components, that comprise one or more of the computing device 1000 and the controller 200.

The control routine 240 may comprise a monitoring component 244 executable by the processor circuit 250 to recurringly monitor the voltage detector 214 to detect instances where the voltage level of the electric power provided by one or both of the cells 271 and 272 falls below one or more voltage level thresholds retrieved by the processor circuit 250 from a threshold data 234 that may also be stored in the storage 260. The processor circuit 250 may have been caused to retrieve the those thresholds from storage making up a portion of the monitoring circuit 275 of the battery module 270 (where the monitoring circuit 275 is present). Further, where the monitoring circuit 275 is present and is able to monitor voltage levels of the cells 271 and/or 272, the processor circuit 250 may recurringly monitor the monitoring circuit 275 to monitor those voltage levels in lieu of monitoring the voltage detector 214 to do so.

The control routine 240 may comprise a charging component 245 executable by the processor circuit 250 to alter distribution of electric power at times when the power source 105 provides electric power such that one or both of the sets of cells 271 and 272 may be recharged. Upon detection of the provision of electric power by the power source 105, the processor circuit 250 may be caused to effect provision of electric power from the power source 105 to components of the computing device 1000 (e.g., the processor circuit 150 and the storage 160) in place of provision of electric power from one or both sets of cells 271 and 272 to enable recharging of the cells 271 and/or 272 from the electric power provided by the power source 105.

The control routine 240 may comprise a response component 243 executable by the processor circuit 250 to signal or otherwise provide indications to the processor circuit 150 of aspects of the status of the cells 271 and/or 272. Possible mechanisms of providing such signaling or indication include and are not limited to generating a hardware or software interrupt, making available a register for the processor circuit 150 to poll, or assuming the role of a bus master device on a bus of the coupling 155 to write one or more bits of a memory location and/or register. By way of example, the processor circuit 250 may be caused to provide an indication to the processor circuit 150 of the available electric power from the cells 271 and/or 272 having been greatly diminished such that remaining available runtime of the computing device 1000 is highly limited. Alternatively or additionally, the processor circuit 250 may be caused to provide an indication to the processor circuit 150 that the electric power remaining available in the cells 272 is highly limited such that they are not able to effectively support much more in the way of operation in a high power mode. Such indications to the processor circuit 150 may be triggered by a voltage level of one or both of the cells 271 and 272 having fallen below a voltage level threshold and/or by a temperature of one or both of the cells 271 and 272 having risen above a temperature level threshold. Further, the processor circuit 250 may be caused to provide indications to the processor circuit 150 of whether or not electric power is currently being received from the power source 105 (possibly as a result of detecting whether or not the power source 105 is currently coupled to the computing device 1000). In still one other alternative, the processor circuit 250 may directly signal the clock 151 to reduce the clock speed at which at least the processor circuit 150 operates to effect a transition from a higher power mode to a lower power mode.

The control routine 140 may comprise a clock component 141 executable by the processor circuit 150 to await receipt of an indication from the controller 200 (by whatever mechanism) indicating the status of available electric power from one or more of the power source 105, the set of storage cells 271 and the set of storage cells 272, and to control operation of the clock 151 and/or other components of the computing device 1000 in response. Where the processor circuit 150 receives an indication from the controller 200 that the power source 105 is currently providing electric power, the processor circuit 150 may be caused to either transition the computing device 1000 to a higher power state, at least in part by configuring the clock 151 to provide the processor circuit 150 and/or other components with a higher speed clock signal, or may be caused to enable transitions to such a higher power state where the nature of the processing being performed would normally trigger that transition.

At other times when the cells 271 and 272 are employed to provide electric power (e.g., when the power source 105 is not providing electric power, possibly by having been disconnected from the computing device 1000) and the processor circuit 150 receives an indication of the cells 272 (which are optimized to provide electric power at a higher current level) are significantly depleted, the processor circuit 150 may be caused to respond operating the clock 151 to reduce the current clock speed of at least the processor circuit 150 and/or to disallow transitions into a higher power mode (possibly including an increased clock speed of the clock 151). The processor circuit 150 may be caused to continue to disallow transitions to a higher power mode until the processor circuit 150 receives and indication from the controller that the power source 105 is providing electric power or that the power cells 272 are no longer so depleted.

At still other times when the cells 271 and 272 are employed to provide electric power and the processor circuit 150 receives an indication of the available electric power being significantly depleted such that continued operation of the computing device 1000 will no longer be possible, the processor circuit 150 may be caused to be respond by causing reduction or removal of the provision of electric power various components of the computing device 1000, such as the flash 115 or backlighting of the display 180. The processor circuit 150 may be caused to continue to disallow transitions to a higher power mode until the processor circuit 150 receives and indication from the controller that the power source 105 is providing electric power or that the power cells 271 and 272 are no longer so depleted.

The control routine 140 may comprise a presentation component 148 executable by the processor circuit 150 to present an indication to an operator of the computing device 1000 warning of limited availability of electric power such that operation in a higher power mode is no longer available, or that limited runtime remains from electric power provided by the cells 271 and 272 (e.g., a more general notice of the battery module 270 being almost depleted). The processor circuit 150 may be caused to present this indication visually on the display 180 and/or audibly via the acoustic driver 171 (the choice possibly dependent on whether one or the other has been disabled in some manner by the controller 200 to conserve electric power).

Figure 7:
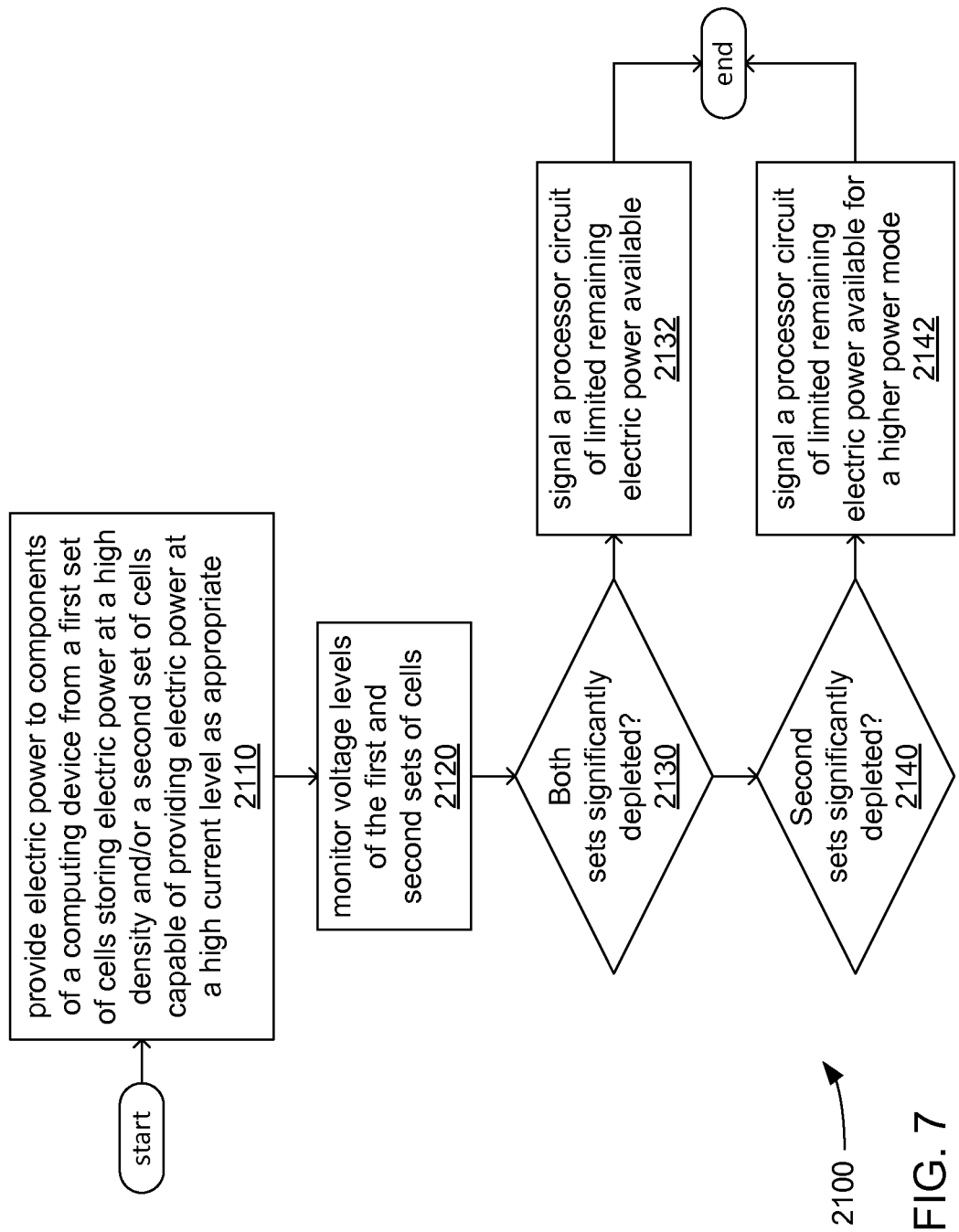
FIG. 7 illustrates an embodiment of a first logic flow.

FIG. 7 illustrates an embodiment of a logic flow 2100. The logic flow 2100 may be representative of some or all of the operations executed by one or more embodiments described herein. More specifically, the logic flow 2100 may illustrate operations performed by components of the controller 200, including the processor circuit 250 in executing at least the control routine 240 and/or components of the controller 200.

At 2110, a controller of a computing device (e.g., the controller 200 of the computing device 1000) provides electric power to other components of the computing device from a first set of cells optimized to store electric power with a relatively high density (e.g., the cells 271) and/or from a second set of cells optimized to provide electric power at a relatively high electric current level (e.g., the cells 272), as appropriate. As has been discussed, the differing characteristics of each of these two types of cells may be relied up on to cause electric power to be provided employing one or the other of the two types of cells. Alternatively, as has also been discussed, an active variant of a distribution circuit may be operated under the control of a controller processor circuit of the controller (e.g., the processor circuit 250) to select between the two types of cells to provide electric power. The controller processor circuit may be caused to make this selection in response to signals received from a main processor circuit (e.g., the processor circuit 150) indicating an impending transition to or from a lower and/or higher power mode.

At 2120, the controller recurringly monitors the voltage levels with which the first and second sets of cells provide electric power. Again, the detected voltage levels are recurringly compared to one or more selected threshold voltage levels (possibly dictated by data accompanying the first and second cells), where a voltage falling below a threshold voltage level is taken as an indication of the set of cells associated with that voltage becoming significantly depleted.

At 2130, if both the first and second sets of cells are significantly depleted, then the controller signals the main processor circuit with an indication that only a limited amount of electric power for operation of the computing device remains at 2132. As has been discussed, the main processor circuit may respond by causing the provision of electric power to various components of the computing device to be reduced or removed in an effort to extend runtime to at least some degree. Alternatively or additionally, the main processor circuit may respond to presenting an indication to the operator of the computing device of there being little in the way of electric power remaining.

However, if it is not the case that both the first and second sets of cells are significantly depleted, then a check is made at 2140 of whether only the second set of cells is significantly depleted. If so, then the controller signals the main processor circuit with an indication that there is only a limited amount of electric power remaining for operation in a higher power mode. As has been discussed, if the main processor circuit is already causing the computing device to operate in the higher power mode, then the main processor circuit may respond by causing a transition out of the higher power mode and into a lower power mode to extend runtime to at least some degree. The main processor circuit may also disallow transitions into the higher power mode until there is a subsequent indication from the controller either of another power source (e.g., AC mains) providing sufficient electric power to support the higher power mode, or of the second set of cells no longer being significantly depleted (e.g., the second set of cells has been recharged).

Figure 8:
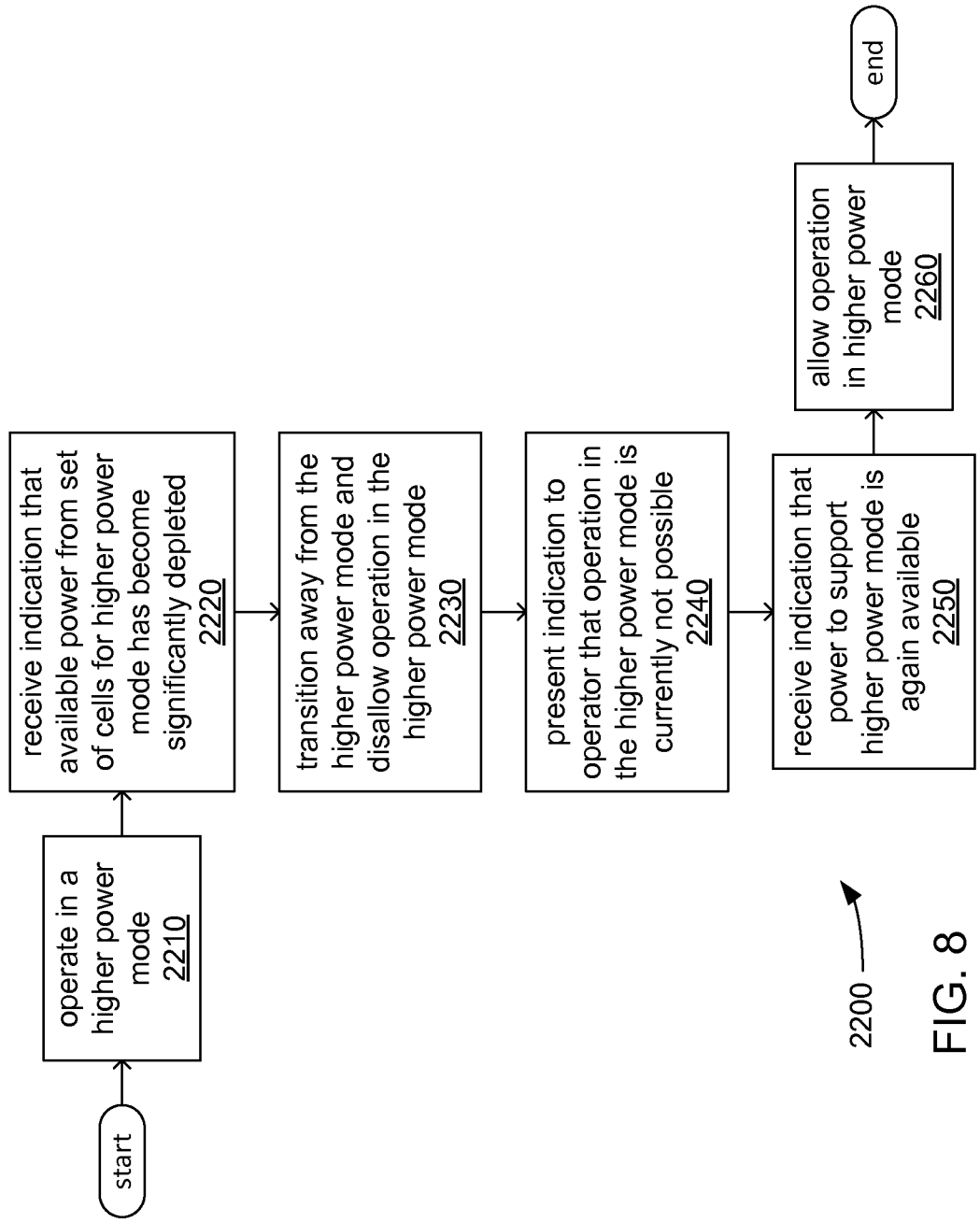
FIG. 8 illustrates an embodiment of a second logic flow.

FIG. 8 illustrates an embodiment of a logic flow 2200. The logic flow 2200 may be representative of some or all of the operations executed by one or more embodiments described herein. More specifically, the logic flow 2200 may illustrate operations performed by components of the controller 200, including the processor circuit 250 in executing at least the control routine 240 and/or components of the controller 200.

At 2210, a main processor circuit of a computing device (e.g., the processor circuit 150 of the computing device 1000) maintains the computing device in a higher power mode. As has been discussed, operation in a higher power mode may be based on a clock circuit providing a higher speed clock signal to one or more processor circuits.

At 2220, the main processor circuit receives an indication that limited electric power remains available from a set of cells optimized to provide electric power with a current level (e.g., the cells 272) for supporting the higher power mode. As discussed, the determination of such limited availability may be based on a voltage level of the output of those cells falling beneath a selected threshold level or a temperature of those cells exceeding selected threshold level.

At 2230, the main processor circuit responds by transitioning the computing device away from the higher power mode, and disallowing operation in the higher power mode.

As discussed, the main processor circuit may continue to disallow operation in a higher power mode until either receiving an indication that electric power to support the higher power mode is once again available from those cells, or that another power source is providing sufficient electric power to support the higher power mode.

At 2240, the main processor circuit further responds to by causing an indication of the inability to operate in a higher power mode to be presented to an operator of the computing device. As has been discussed, such a presentation may be made visually via visual presentation on a display (e.g., the display 180), or may be made in any of a variety of other ways, including audibly.

At 2250, the main processor circuit receives an indication that power to support the higher power mode is once again available. Again, this may be due to recharging of those cells (raising their output voltage back above the threshold), a drop in temperature of those cells (dropping their temperature back below the threshold), or a different power source now providing sufficient electric power to support the higher power mode in lieu of electric power from the set of cells. The main processor circuit responds to this new indication by once again allowing operation in the higher power mode.

Figure 9:
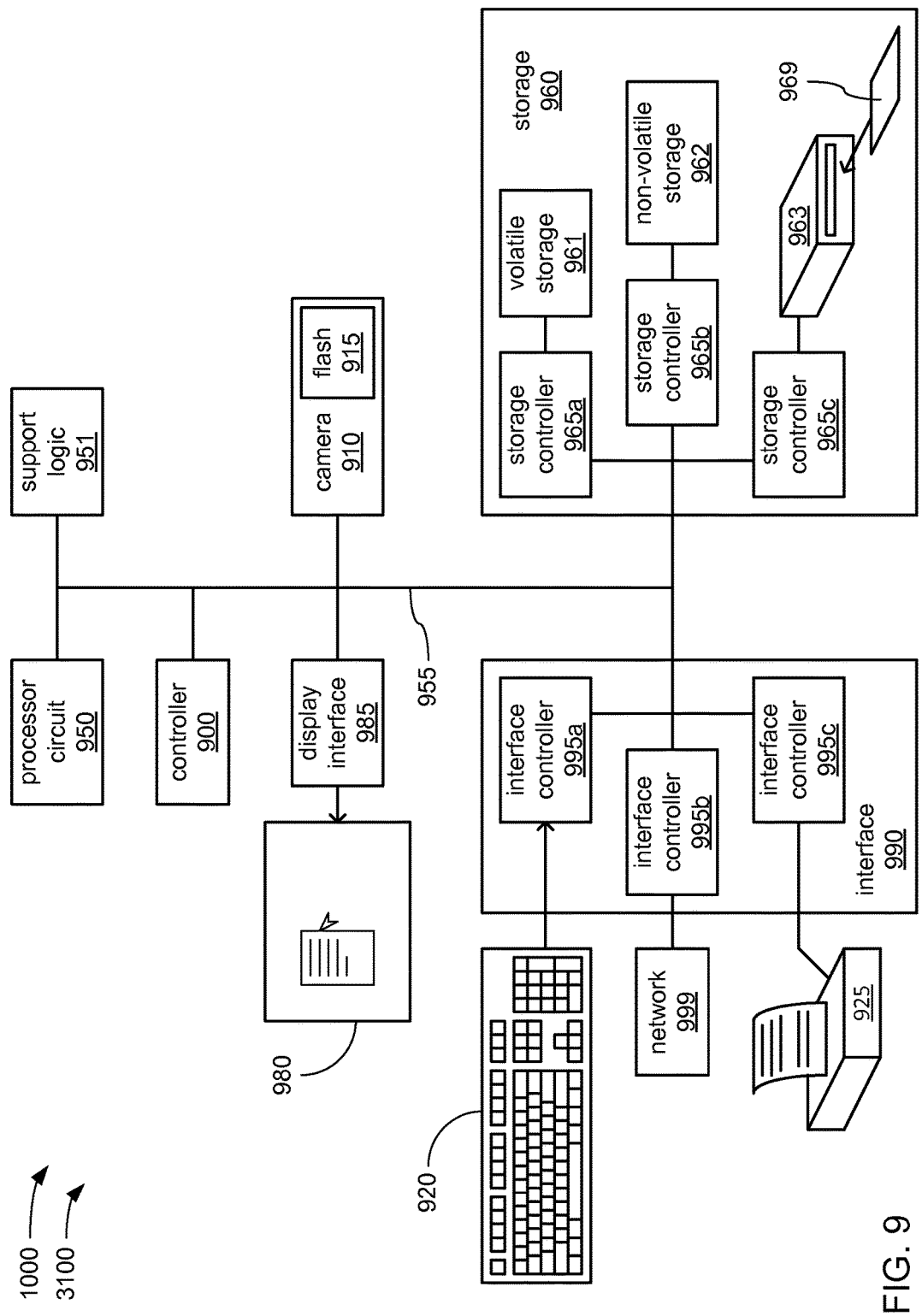
FIG. 9 illustrates an embodiment of a processing architecture.

FIG. 9 illustrates an embodiment of an exemplary processing architecture 3100 suitable for implementing various embodiments as previously described. More specifically, the processing architecture 3100 (or variants thereof) may be implemented as part of the computing device 1000, and/or within the controller 200. It should be noted that components of the processing architecture 3100 are given reference numbers in which the last two digits correspond to the last two digits of reference numbers of components earlier depicted and described as part of each of the computing device 1000 and the controller 200. This is done as an aid to correlating such components of whichever ones of the computing device 1000 and the controller 200 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3100, a computing device comprises at least a processor circuit 950, support logic 951, a storage 960, a controller 900, an interface 990 to other devices, and coupling 955. As will be explained, depending on various aspects of a computing device implementing the processing architecture 3100, including its intended use and/or conditions of use, such a computing device may further comprise additional components, such as without limitation, a camera 910 comprising a flash 915, an audio subsystem 970 comprising an audio amplifier 975 and an acoustic driver 971, and a display interface 985.

The controller 900 corresponds to the controller 200. As previously discussed, the controller 200 may implement the processing architecture 3100. Thus, in essence, the controller 200 could be regarded, at least to some extent, as a computing device embedded within the computing device 1000. As such, the controller 200 may perform various functions, including those that have been described at length herein, in support of the computing device 1000 performing various functions.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990, the camera 910, the audio subsystem 970 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150 and 250) may comprise any of a wide variety of commercially available processors, employing any of a wide variety of technologies and implemented with one or more cores physically combined in any of a number of ways.

As previously discussed, the storage 960 (corresponding to one or more of the storages 160 and 260) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage medium 969 (possibly corresponding to the storage medium 169), the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (perhaps a network comprising one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to the display 180), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing device 1000 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of a battery module includes a first cell, and a second cell to store electric energy with a lesser energy density than the first cell and to provide electric energy stored therein at a higher current level than the first cell.

The above example of a battery module in which the battery module includes a casing in which the first cell and the second cell are disposed, and a monitoring circuit disposed in the casing, the monitoring circuit to monitor one of a voltage of at least one of the first and second cells, a current flow of at least one of the first and second cells, and a temperature of at least one of the first and second cells.

Either of the above examples of a battery module in which the first and second cells based on a substantially similar battery chemistry.

Any of the above examples of a battery module in which the battery chemistry includes one of nickel cadmium (NiCd), nickel metal hydride (NiMH), lithium ion (Li-ion) and lithium polymer (Li-poly).

Any of the above examples of a battery module in which the first and second cells based on different battery chemistries.

Any of the above examples of a battery module in which the first cell includes a first energy storage layer, a first anode conductor and a first cathode conductor; the second cell includes a second energy storage layer, a second anode conductor and a second cathode conductor; the second energy storage layer is selected to be thinner than the first energy storage layer; the second anode conductor is selected to be thicker than the first anode conductor; and the second cathode conductor is selected to be thicker than the second anode conductor.

Any of the above examples of a battery module in which the first cell has a higher resistance than the second cell.

Any of the above examples of a battery module in which the battery module includes a first multitude of cells comprising the first cell, each cell of the first multitude to store electric energy with a high density, multiple cells of the first multitude coupled in at least one of series and parallel; and a second multitude of cells comprising the secondcell, each cell of the second multitude to provide electric energy with a high current level, multiple cells of the second multitude coupled in at least one of series and parallel.

An example of a controller includes logic to provide electric power from a first cell optimized to store electric energy with a relatively high density to a main processor circuit of a computing device when the computing device is operated in a lower power mode, and provide electric power from a second cell optimized to provide electric energy with a relatively high current level to the main processor circuit when the computing device is operated in a higher power mode.

The above example of a controller in which the logic is to monitor a voltage output of at least one of the first cell and the second cell, and signal the main processor circuit of significant depletion of available electric power of at least one of the first cell and the second cell based on the voltage falling below a selected threshold.

Either of the above examples of a controller in which the logic is to monitor a first voltage output of the first cell, monitor a second voltage output of the second cell, and signal the main processor circuit of an inability to provide electric power to support the higher power mode based on the first voltage remaining above a first threshold and the second voltage falling below a second threshold.

Any of the above examples of a controller in which the logic is to detect provision of electric power sufficient to support the higher power mode by a power source, and signal the main processor circuit of an ability to again provide electric power to support the higher power mode based on the provision of electric power by the power source.

Any of the above examples of a controller in which the controller is to receive a signal from the main processor indicative of an impending transition of the computing device to the higher power mode, and provide electric power from the second cell to the main processor circuit based on receipt of the signal.

Any of the above examples of a controller in which the first and second cells are disposed in a casing of a battery module comprising a monitoring circuit disposed in the casing, the controller to employ the monitoring circuit to monitor one of a voltage of at least one of the first and second cells, a current flow of at least one of the first and second cells, and a temperature of at least one of the first and second cells.

Any of the above examples of a controller in which the first and second cells are based on a substantially similar battery chemistry, the battery chemistry comprising one of nickel cadmium (NiCd), nickel metal hydride (NiMH), lithium ion (Li-ion) and lithium polymer (Li-poly).

Any of the above examples of a controller in which the first cell includes a first energy storage layer, a first anode conductor and a first cathode conductor; the second cell includes a second energy storage layer, a second anode conductor and a second cathode conductor; the second energy storage layer is selected to be thinner than the first energy storage layer; the second anode conductor is selected to be thicker than the first anode conductor; the second cathode conductor is selected to be thicker than the second anode conductor; and the first cell having a higher resistance and a higher capacitance than the second cell.

An example of a device includes a main processor circuit operable in either a lower power mode and a higher power mode, the higher power mode to consume a larger amount of electric energy than the lower power mode; a controller to monitor a first voltage output of a first cell and a second voltage output of a second cell; and logic to receive a signal from the controller indicative of an inability to provide electric power to support the higher power mode based on the first voltage remaining above a first threshold and the second voltage falling below a second threshold, and transition the main processor circuit from the higher power mode to the lower power mode based on receipt of the signal.

The above example of a device in which the device includes a clock circuit to provide a clock signal to the main processor circuit, the controller to cause the clock circuit to decrease a frequency of the clock signal to transition the main processor circuit from the higher power mode to the lower power mode based on receipt of the signal.

Either of the above examples of a device in which the device includes a display, the main processor to cause an indication of the inability to provide electric power to support the higher power mode to be visually presented on the display.

Any of the above examples of a device in which the logic is to receive a signal from the controller indicative of provision of electric power sufficient to support the higher power mode by a power source.

Any of the above examples of a device in which the logic is to receive a signal from the controller indicative of provision of electric power sufficient to support the higher power mode by the second cell.

Any of the above examples of a device in which the logic is to signal the controller with an indication of an impending transition of the computing device to the higher power mode to cause the controller to provide electric power from the second cell to the main processor circuit.

An example of a computer-implemented method includes providing electric power from a first cell optimized to store electric energy with a relatively high density to a main processor circuit of a computing device when the computing device is operated in a lower power mode, and providing electric power from a second cell optimized to provide electric energy with a relatively high current level to the main processor circuit when the computing device is operated in a higher power mode.

The above example of a computer-implemented method in which the method includes monitoring a voltage output of at least one of the first cell and the second cell, and signaling the main processor circuit of significant depletion of available electric power of at least one of the first cell and the second cell based on the voltage falling below a selected threshold.

Either of the above examples of a computer-implemented method in which the method includes monitoring a first voltage output of the first cell, monitoring a second voltage output of the second cell, and signaling the main processor circuit of an inability to provide electric power to support the higher power mode based on the first voltage remaining above a first threshold and the second voltage falling below a second threshold.

Any of the above examples of a computer-implemented method in which the method includes detecting provision of electric power sufficient to support the higher power mode by a power source, and signaling the main processor circuit of an ability to again provide electric power to support the higher power mode based on the provision of electric power by the power source.

Any of the above examples of a computer-implemented method in which the method includes receiving a signal from the main processor indicative of an impending transition of the computing device to the higher power mode, and providing electric power from the second cell to the main processor circuit based on receipt of the signal.

The invention claimed is:

1. A battery module comprising:
a first cell comprising a first energy storage layer, and the first cell comprising a first anode conductor and a first cathode conductor; and
a second cell comprising a second energy storage layer thinner than the first energy storage layer, the second cell to store electric energy with a lesser energy density than the first cell and to provide electric energy stored therein at a higher current level than the first cell, wherein the first cell has a higher resistance than the second cell, and the second cell comprising a second anode conductor and a second cathode conductor, wherein the second anode conductor is thicker than the first anode conductor and the second cathode conductor is thicker than the second anode conductor.

2. The battery module of claim 1, comprising:
a casing in which the first cell, the second cell, and the monitoring circuit are disposed, the monitoring circuit to monitor one or more of a voltage of the first cell, a current flow of at least one of the first and second cells, and a temperature of at least one of the first and second cells.

3. The battery module of claim 1, the first and second cells based on a substantially similar battery chemistry.

4. The battery module of claim 3, the battery chemistry comprising one of nickel cadmium (NiCd), nickel metal hydride (NiMH), lithium ion (Li-ion) and lithium polymer (Li-poly).

5. The battery module of claim 1, the first and second cells based on different battery chemistries.

6. The battery module of claim 1, comprising:
a first multitude of cells comprising the first cell, each cell of the first multitude to store electric energy with a high density, multiple cells of the first multitude coupled in at least one of series and parallel; and
a second multitude of cells comprising the second cell, each cell of the second multitude to provide electric energy with a high current level, multiple cells of the second multitude coupled in at least one of series and parallel.

7. A system comprising:
a processing unit;
a battery electrically coupled to the processing unit, the battery comprising:
a first cell comprising a first anode conductor and a first cathode conductor; and
a second cell to store electric energy with a lesser energy density than the first cell and to provide electric energy stored therein at a higher current level than the first cell, wherein the first cell has a higher resistance than the second cell, and the second cell comprising a second anode conductor and a second cathode conductor, wherein the second anode conductor is thicker than the first anode conductor and the second cathode conductor is thicker than the second anode conductor.

8. The system of claim 7, the battery comprising:
a casing in which the first cell, the second cell, and a monitoring circuit are disposed, controller to monitor one or more of a voltage of the first cell the voltage of the second cell, a current flow of at least one of the first and second cells, and a temperature of at least one of the first and second cells via the monitoring circuit.

9. The system of claim 7, the first and second cells based on a substantially similar battery chemistry.

10. The system of claim 9, the battery chemistry comprising one of nickel cadmium (NiCd), nickel metal hydride (NiMH), lithium ion (Li-ion) and lithium polymer (Li-poly).

11. The system of claim 7, the first and second cells based on different battery chemistries.

12. The system of claim 7, the battery comprising:
a first multitude of cells comprising the first cell, each cell of the first multitude to store electric energy with a high density, multiple cells of the first multitude coupled in at least one of series and parallel; and
a second multitude of cells comprising the second cell, each cell of the second multitude to provide electric energy with a high current level, multiple cells of the second multitude coupled in at least one of series and parallel.

13. An apparatus comprising:

a battery, the battery comprising:

a first cell comprising a first anode conductor and a first cathode conductor;

a second cell to store electric energy with a lesser energy density than the first cell and to provide electric energy stored therein at a higher current level than the first cell, wherein the first cell has a higher resistance than the second cell, and the second cell comprising a second anode conductor and a second cathode conductor, wherein the second anode conductor is thicker than the first anode conductor and the second cathode conductor is thicker than the second anode conductor; and a battery controller, the battery controller to:

provide electric power from the first cell to a main processor circuit of a computing device when the computing device is operated in a lower power mode;

provide electric power from the second cell to the main processor circuit when the computing device is operated in a higher power mode;

monitor a voltage output of the second cell; and signal the main processor to limit operation of the computing device in the higher power mode based on the voltage output of the second cell.

14. The apparatus of claim 13, the battery controller to:

monitor a voltage output of the second cell; and signal the main processor circuit of significant depletion of available electric power of at least one of the first cell and the second cell based on the voltage of the respective cell falling below a selected threshold.

15. The apparatus of claim 13, the battery controller to:

monitor a first voltage output of the first cell; and signal the main processor circuit of an inability to provide electric power to support the higher power mode based on the first voltage remaining above a first threshold and the second voltage falling below a second threshold.

16. The apparatus of claim 13, the battery controller to:

detect provision of electric power sufficient to support the higher power mode by a power source; and signal the main processor circuit of an ability to again provide electric power to support the higher power mode based on the provision of electric power by the power source.

17. The apparatus of claim 13, the battery controller to:

receive a signal from the main processor indicative of an impending transition of the computing device to the higher power mode; and provide electric power from the second cell to the main processor circuit based on receipt of the signal.

18. The apparatus of claim 13, comprising:

a casing, the first and second cells disposed in the casing; and a monitoring circuit disposed in the casing, the battery controller to employ the monitoring circuit to monitor at least one of a voltage output of the first cell, the voltage output of the second cell, a current flow of at least one of the first and second cells, or a temperature of at least one of the first and second cells.

19. The apparatus of claim 13, the first and second cells based on a substantially similar battery chemistry, the battery chemistry comprising one of nickel cadmium (NiCd), nickel metal hydride (NiMH), lithium ion (Li-ion) and lithium polymer (Li-poly).

20. The apparatus of claim 13, the first cell having a higher capacitance than the second cell.

* * * * *